Patented Jan. 1, 1924.

1,479,293

UNITED STATES PATENT OFFICE.

MARTIN FREUND, DECEASED, LATE OF FRANKFORT-ON-THE-MAIN, GERMANY; BY WALTER FREUND, ADMINISTRATOR, OF FRANKFORT-ON-THE-MAIN, AND EDMUND SPEYER, OF FRANKFORT-ON-THE-MAIN, GERMANY.

PRODUCT OF REDUCTION OF OXYCODEINON AND PROCESS OF PREPARING THE SAME.

No Drawing. Original application filed July 15, 1921, Serial No. 485,130. Divided and this application filed March 15, 1922. Serial No. 544,010.

(GRANTED UNDER THE PROVISIONS OF THE ACT OF MARCH 3, 1921, 41 STAT. L., 1313.)

*To all whom it may concern:*

Be it known that MARTIN FREUND, deceased, formerly a resident of Frankfort-on-the-Main, for whom the undersigned WALTER FREUND, residing at Frankfort-on-the-Main, Germany, citizen of the German Republic, is acting administrator, and I, EDMUND SPEYER, a resident of Frankfort-on-the-Main, Germany, a citizen of the German Republic, have invented certain new and useful Improvements in a Product of Reduction of Oxycodeinon and Processes of Preparing the Same (for which we have made application in Germany April 14, 1916, Patent No. 296,916; in Austria Dec. 9, 1916, Patent No. 75,740; in Hungary Dec. 9, 1916, Patent No. 71,587; in Switzerland Dec. 7, 1916, Patent No. 75,110; in Norway Dec. 30, 1919, Patent No. 31,350; in Czechoslovakia Feb. 10, 1920, Patent No. 2228; in Denmark Dec. 29, 1919; in Sweden Jan. 20, 1920; in Italy Feb. 23, 1920, and Netherlands Dec. 31, 1919), of which the following is a clear, full, and exact description.

The subject of this invention is dihydrooxycodeinon, an unknown derivative of oxycodeinon—a product described in the German Letters Patent No. 286431—and the process of preparing the same.

Oxycodeinon, having the formula $C_{18}H_{19}NO_4$ and a melting point of 275° C., by boiling with a solution of sodium hydrosulphite, is reduced to dihydrooxycodeinon of the formula $C_{18}H_{21}NO_4$. Dihydrooxycodeinon prepared in such manner is actually identical with dihydrooxycodeinon as prepared in accordance with the specification of the patent application Serial Number 485130, filed July 15, 1921, from which this application is a divisional application.

The identity is shown by the following facts. Dihydrooxycodeinon prepared in accordance with this application crystallizes from alcohol in long jagged columns melting at 222° C. and yields well crystallized salts. Its hydrochloride $C_{18}H_{20}NO_4.HCl$ crystallizes from water or diluted alcohol in columns melting at 268 to 270° C. Its free base is precipitated from solutions of the salts by ammonia, soda or alkalies; it is insoluble in excess of alkalies. It combines with methyl iodide to form $C_{18}H_{21}NO_4.CH_3I$ a compound representing prisms which decompose at 251° C. Its ketone character is shown by the formation of an oxime, the hydrochloride of which: $C_{18}H_{22}N_2O_4.HCl$ is isolated in small sticks decomposing at 275 to 278° C.

The new dihydrooxycodeinon is to be used in medicine and pharmacy.

Example: 10 grms. oxycodeinon are heated with a solution of 20 grms. sodium hydrosulphite $Na_2S_2O_4$ in 60 cc. water. After a short time complete solution takes place. Upon supersaturating with soda or ammonia 6 grams dihydrooxycodeinon are separated in crystalline form.

Having thus described this invention, we claim as new and desire to secure by Letters Patent:

1. The process of preparing dihydrooxycodeinon, melting at 222° C., which consists in boiling oxycodeinon together with a solution of sodium hydrosulphite.

2. A new product of reduction, obtained by heating oxycodeinon together with a solution of sodium hydrosulphite, dihydrooxycodeinon having the formula $C_{18}H_{21}NO_4$, which crystallizes from alcohol in long jagged columns, melting at 222° C., and yields well crystallized salts and forms an oxime, the hydrochloride of which is isolated in small sticks decomposing at 275 to 278° C.

In testimony whereof we have hereunto signed our names in the presence of the two subscribing witnesses.

DR. WALTER FREUND,
*Acting administrator upon the estate of the deceased inventor, Martin Freund.*
PRIVATE AGENT DR. EDMUND SPEYER.

Witnesses:
FRITZ MAYER,
FRIEDRICH L. HAHN.